(12) United States Patent
Hardy et al.

(10) Patent No.: US 8,817,424 B1
(45) Date of Patent: Aug. 26, 2014

(54) ARM ASSEMBLY WITH LIFT TAB

(71) Applicant: Seagate Technology LLC, Cupertino, CA (US)

(72) Inventors: Daniel Hardy, Mound, MN (US); Pow Hing Yong, Singapore (SG); Liu Xiong, Singapore (SG); Keefe Russell, Robbinsdale, MN (US); Heng Tung Joseph Lau, Singapore (SG)

(73) Assignee: Seagate Technology LLC, Cuptertino, CA (US)

( * ) Notice: Subject to any disclaimer, the term of this patent is extended or adjusted under 35 U.S.C. 154(b) by 0 days.

(21) Appl. No.: 13/796,850

(22) Filed: Mar. 12, 2013

(51) Int. Cl.
*G11B 5/48* (2006.01)
*G11B 5/54* (2006.01)

(52) U.S. Cl.
CPC .................................. *G11B 5/4833* (2013.01)
USPC ........................................ 360/255; 360/245.3

(58) Field of Classification Search
USPC .......... 360/245.3, 245.7, 254.7, 254.8, 254.9, 360/255
See application file for complete search history.

(56) References Cited

U.S. PATENT DOCUMENTS

| | | | |
|---|---|---|---|
| 5,864,448 A * | 1/1999 | Berberich | 360/254.8 |
| 6,151,197 A * | 11/2000 | Larson et al. | 360/255 |
| 6,181,529 B1 * | 1/2001 | Aoyagi et al. | 360/255 |
| 6,301,081 B1 | 10/2001 | Fahey | |
| 6,611,402 B1 | 8/2003 | Mangold | |
| 7,010,847 B1 | 3/2006 | Hadian et al. | |
| 7,450,347 B2 | 11/2008 | Suzuki et al. | |
| 7,489,476 B1 | 2/2009 | Bjorstrom et al. | |
| 7,675,712 B2 | 3/2010 | Liu et al. | |
| 7,724,476 B1 | 5/2010 | Bjorstrom et al. | |
| 2005/0030671 A1 * | 2/2005 | Lee et al. | 360/255 |

* cited by examiner

*Primary Examiner* — Jefferson Evans

(74) *Attorney, Agent, or Firm* — HolzerIPLaw, PC

(57) ABSTRACT

An arm assembly for a disc drive. The arm assembly has a load arm for supporting a slider and has a lift tab with a ramp-engaging region for parking the load arm when not in use. This ramp-engaging region has an outer surface defined by a first radius and a second radius different than the first radius.

20 Claims, 4 Drawing Sheets

ARM ASSEMBLY WITH LIFT TAB

BACKGROUND

Hard disc drive systems (HDDs) typically include one or more data storage discs. A transducing head carried by a slider is used to read from and write to a data track on a disc. The slider is carried by an arm assembly that includes an actuator arm and a suspension assembly. When the disc drive is in a non-operating condition, typically when power has been turned off to the disc drive, the arm assembly unloads the slider from engagement with the disc by moving onto a nearby ramp.

SUMMARY

The present disclosure provides an arm assembly having a lift tab configured to facilitate the engagement with the ramp.

One particular embodiment of this disclosure is an arm assembly for a disc drive, the arm assembly having a load arm for supporting a slider and having a lift tab. The lift tab, in turn, has a ramp-engaging region with an outer surface defined by a first radius and a second radius different than the first radius.

Another particular embodiment of this disclosure is an arm assembly for a disc drive, the arm having a load arm supporting a slider and having a lift tab having a length between its distal tip and the load arm. The lift tab has a ramp-engaging region with an outer surface having a continuous cross-sectional shape when taken orthogonal to the length of the lift tab, the shape defining a base trough having a first radius and an arm having a second radius. The second radius is less than the first radius.

Another particular embodiment of this disclosure is a disc drive. The disc drive includes a disc, an arm assembly supporting a slider and having a lift tab, and a parking ramp. The lift tab has a ramp-engaging region with an outer surface defined by a first radius and a second radius different than the first radius.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which.

DETAILED DESCRIPTION

The present embodiments relate most generally to arm assemblies for disc drives, particularly, to ramp-engaging sections of a lift tab, configured to engage with and park the arm assembly on a ramp when the disc drive is not in use.

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Figure 1:
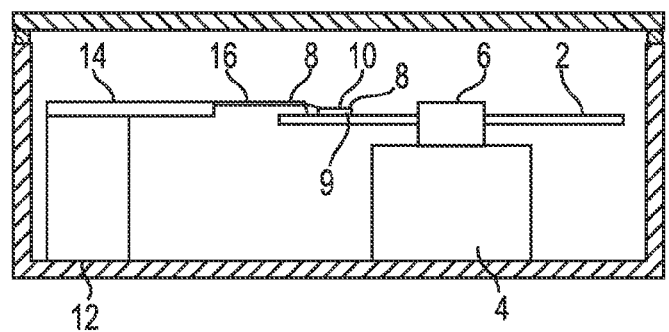
FIG. 1 is a sectional side view of a magnetic recording disc drive and arm assembly.
Figure 2A:
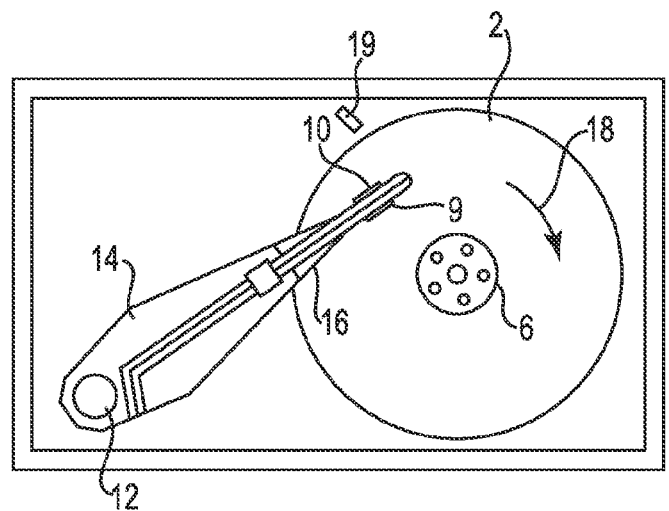
FIGS. 2A and 2B are top views of the magnetic recording disc drive and arm assembly of FIG. 1.
Figure 2B:
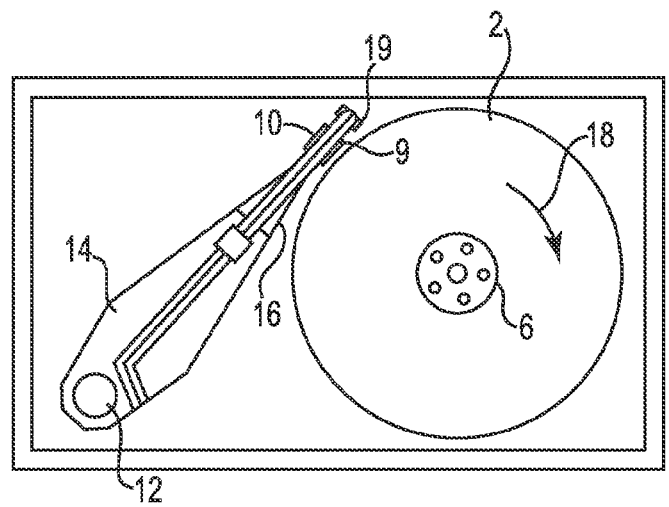

Referring to FIGS. 1, 2A and 2B, a generic magnetic recording disc drive is illustrated, having a magnetic recording disc 2 which is rotated by drive motor 4 with hub 6 which is attached to the drive motor 4. A read/write head or transducer 8 is present on the trailing end or surface 9 of a slider 10. Slider 10 is connected to an actuator 12 by means of an arm assembly 14 that includes a suspension element 16. Suspension element 16 provides a bias force which urges slider 10 toward the surface of disc 2. Suspension element 16 includes various other features, such as a gimbal, gimbal limiter, and other elements that are not shown in the figures.

During operation of the disc drive, shown in FIG. 2A, drive motor 4 rotates disc 2 at a constant speed in the direction of arrow 18 and actuator 12 which is typically a linear or rotary motion coil motor drives slider 10 generally radially across the plane of the surface of disc 2 so that read/write head 8 may access different data tracks on disc 2. In preparation of non-operation of the disc drive, shown in FIG. 2B, arm assembly 14 moves (e.g., pivots), disengaging slider 10 from disc 2 and parking itself on a ramp 19. When parked, a portion of arm assembly 14 physically rests on a parking surface of ramp 19.

Figure 3A:
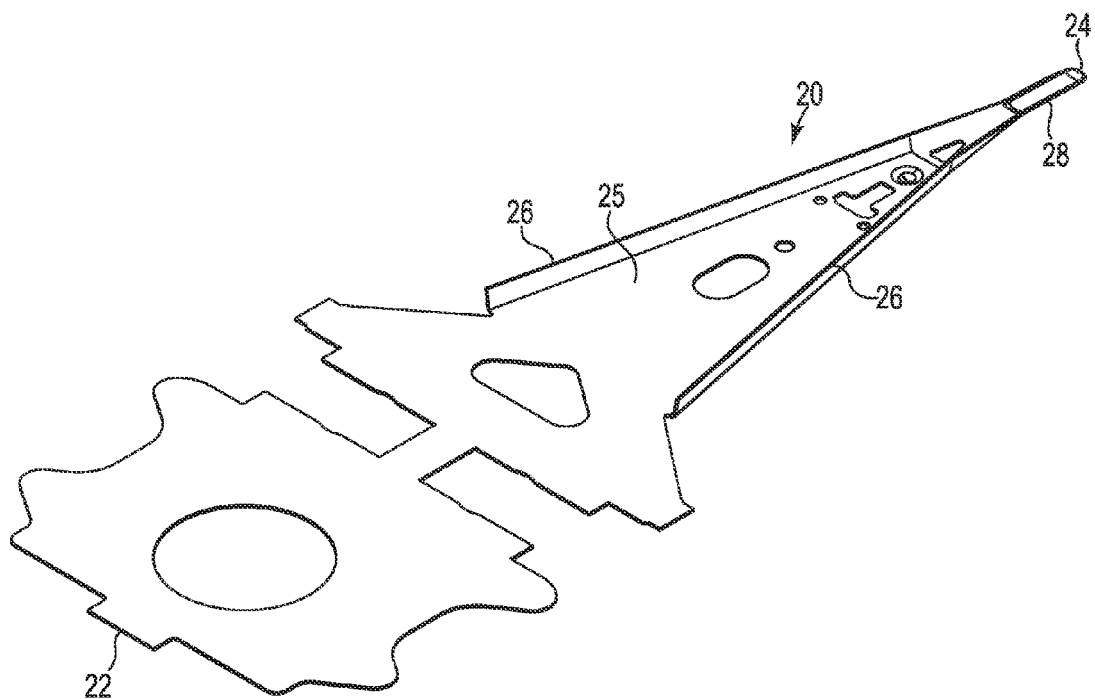
FIG. 3A is a perspective view of a portion of an arm of an arm assembly.
Figure 3B:
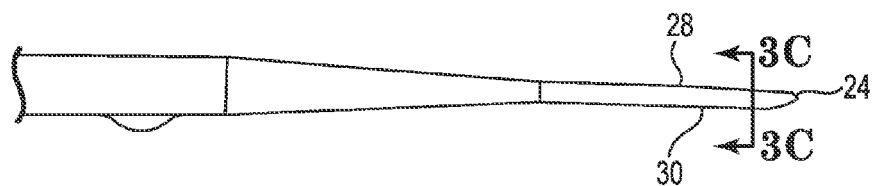
FIG. 3B is a side view of a portion of the arm.

FIGS. 3A and 3B show an arm assembly design that has a load beam or load arm 20 with a proximal end 22 and an opposite distal end 24. Load arm 20 has an elongate central planar surface 25 bounded by rails 26 that extend from the proximal end 22 toward distal end 24 of arm 20; rails 26 are illustrated as on the top surface of load beam 20, although in other embodiment rails 26 may be present on the bottom surface of arm 20, if present at all. Rails 26 provide lateral and bending stiffening and increase torsion resistance to arm 20, and are often formed by folding or bending the material (e.g., stainless steel) that forms central planar surface 25. Arm 20 includes lift tab 28 having a ramp-engaging region 30, which is configured to engage a parking surface of a ramp (ramp 19 in FIGS. 2A and 2B) when the disc drive is in a non-operating state and during deceleration of the disc during power-down operations. Ramp-engaging region 30 extends no more than 1.5 mm from the distal tip of lift tab 28, which in FIGS. 3A and 3B, is distal end 24. In some embodiments, ramp-engaging region 30 extends no more than 1 mm from the distal tip.

Figure 3C:
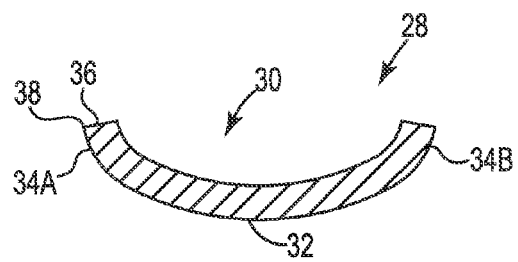
FIG. 3C is a cross-sectional view taken along line C-C of FIG. 3B.

FIG. 3C illustrates a cross section of lift tab 28 in ramp-engaging region 30. Ramp-engaging region 30 has an arcuate outer surface, which facilitates lift tab 28 in engaging with ramp 19. The embodiment of lift tab 28 illustrated in FIG. 3C has a central base or trough portion 32 and two distal ends or arms 34A, 34B, one on either side of trough portion 32. In the illustrated embodiments, arms 34A, 34B have equal length, although in alternate embodiments, arms 34A, 34B may have different lengths. In most embodiments, base or trough portion 32 occupies 30-80% of the trough-shape and arms 34A, 34B occupy 20-70% of the trough shape.

Arms 34A, 34B terminate at an end surface 36, and a leading edge 38 is defined by the intersection of the outer surface of arms 34A, 34B and end surface 36. As lift tab 28 is brought into engagement with the surface of ramp 19, the outer surface of ramp-engaging region 30 engages with and slides over the surface of ramp 19. As the number of discs 2 in a disc drive increases, the space allotted for each disc 2 and arm assembly 14 decreases, in turn requiring a thinner ramp 19 and/or a less high lift tab 28. When arm assembly 14 is parked on ramp 19 in the off-disc state, lift tab 28 is the portion of assembly 14 that is often the closest portion of assembly 14 to the next adjacent surface (e.g., adjacent disc 2, a drive cover, or another arm assembly 14).

Lift tab 28 of FIGS. 3A, 3B and 3C is positioned at the distal end of load arm 20. In alternate embodiments, the lift tab may be present at a location proximal to the distal end of arm 20; see for example, FIG. 2 of U.S. Pat. No. 6,611,402. It is to be understood that the features of this disclosure can be applied to distal lift tabs and non-distal lift tabs.

In this disclosure, arm assemblies are provided that have a ramp-engaging region 30 with a curvature that is defined by at least two different radii. By utilizing two or more different radii to form the arcuate outer surface of lift tab 28 such that the overall height of lift tab 28 is maintained, the stiffness of lift tab 28 is increased, reducing the opportunity for twisting and sagging of load beam 20 and slider 10. Further, end surface 36 (FIG. 3C) comes more parallel with trough portion 32, which also increases stiffness of lift tab 28. By forming the ends or arms 34A, 34B of lift tab 28 with a tighter radius than trough portion 32, not only is the stiffness of lift tab 28 increased, the margin of error for the lift tab contacting ramp 19 on the curved portion as desired is also increased, and the likelihood of leading edge 38 contacting ramp 19 (and thus creating scratches, debris or particles, or not successfully unloading onto ramp 19) is decreased. These features are beneficial for all arm assemblies 14, and particularly for disc drives with multiple discs 2, as the features also provide better clearance for back-to-back discs. Additionally, the overall lift tab 28 height may be decreased while maintaining a similar lift tab stiffness, relative to a comparative single radius structure, to facilitate a tighter clearance between the inside disc heads.

In some embodiments, the first radius is within the range of 0.075 mm-0.5 mm and the second radius is within the range of 0.05 mm-0.5 mm, although larger and/or smaller radii could be used, depending on manufacturing techniques and overall disc drive configuration and construction. In some embodiments, three or even four different radii can be used to define the curvature of ramp-engaging region 30. Additionally or alternately, a portion of ramp-engaging region 30 may be defined by a gradually varying radius; such a region would not be separated into sections with distinct radius for each section, but would have a constantly varying shape.

The difference between the at least two radii is at least 0.05 mm, in some embodiments at least 0.1 mm. Greater differences, such as 0.15 mm, 0.2 mm and 0.3 mm are also suitable. In general, the tighter radius is no more than 90% of the larger radius (i.e., ≤90% of the larger radius), in some embodiments no more than 75%. In some embodiments, the tighter radius is 50% or less of the larger radius. As examples, a tighter radius of 0.075 mm is 30% of a larger radius of 0.25 mm, a tighter radius of 0.25 mm is 50% of a larger radius of 0.5 mm, a tighter radius of 0.05 mm is 33% of a larger radius of 0.15 mm, a tighter radius of 0.05 mm is 14% of a larger radius of 0.35 mm, and a tighter radius of 0.15 mm is 43% of a larger radius of 0.35 mm. Although the tighter radius may be used for trough 32 or for arms 34A, 34B, having the tighter radius for arms 34A, 34B is more typical.

FIGS. 4 through 7 illustrate four specific, non-limiting examples of cross-sections of ramp-engaging regions of lift tabs that have a curvature that is defined by at least two different radii. Also included in each of FIGS. 4 through 7 is a cross-section of a comparative ramp-engaging region that has a constant curvature, defined by a single radius. In each figures, the ramp-engaging regions are illustrated engaged with ramp 19.

Figure 4:
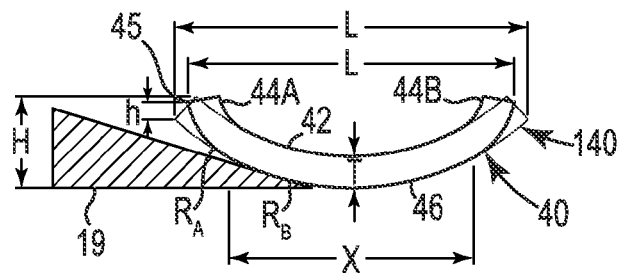
FIG. 4 is a schematic end view of an embodiment of a ramp-engaging section of an arm assembly according to this disclosure.

In FIG. 4, a ramp-engaging structure 40 has a trough portion 42, opposite arms 44A, 44B and a leading edge 45. The outer surface 46 of structure 40 is defined by two different radii, the radius changing at the transition between trough portion 42 and arms 44A, 44B. Trough portion 42 occupies approximately 60-70% of the length X of structure 40. Also illustrated in FIG. 4, overlaid on structure 40, is comparative traditional structure 140 utilizing a single radius of curvature.

As one particular example, outer surface 46 of trough portion 42, which has a length X of 0.2324 mm, is defined by a radius $R_B$ of 0.2500 mm, and arms 44A, 44B having a radius $R_A$ of 0.0750 mm. The entire comparative structure 140 is defined by a single radius of 0.2500 mm. The thickness T of both structure 40 and comparative structure 140 is 0.0300 mm. By increasing the radius $R_A$ of arms 44A, 44B, the overall height H of structure 40 compared to structure 140 remains unchanged as 0.0871 mm, but the overall length L of structure 40 compared to comparative structure 140 is decreased from 0.3361 mm to 0.3102 mm, and the position of leading edge 45 is raised by height h of 0.0170 mm.

Figure 5:
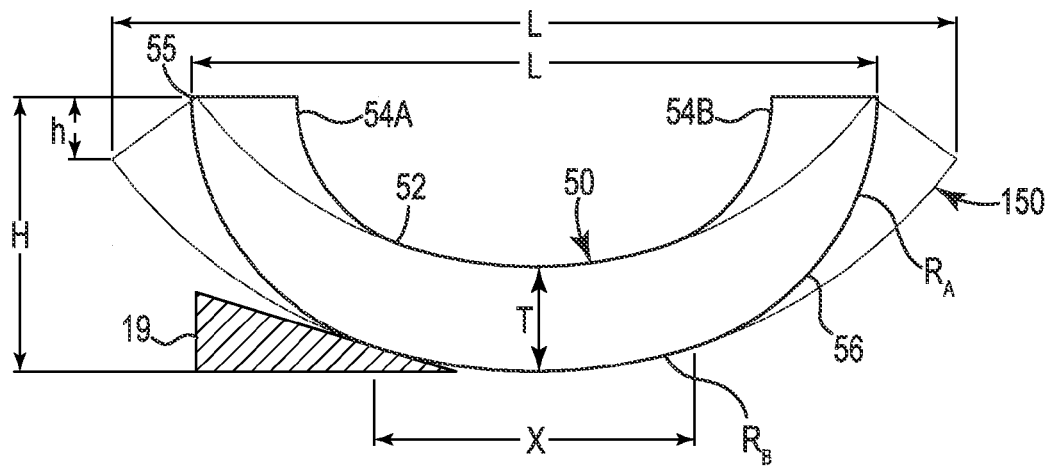
FIG. 5 is a schematic end view of another embodiment of a ramp-engaging section of an arm assembly according to this disclosure.

In FIG. 5, a ramp-engaging structure 50 has a trough portion 52, opposite arms 54A, 54B and a leading edge 55. The outer surface 56 of structure 50 is defined by two different radii, the radius changing at the transition between trough portion 52 and arms 54A, 54B. Trough portion 52 occupies approximately 50% of the length X of structure 50. Also illustrated in FIG. 5, overlaid on structure 50, is comparative structure 150.

As one particular example, outer surface 56 of trough portion 52, which has a length L of 0.3052 mm, is defined by a radius $R_B$ of 0.5000 mm, and arms 54A, 54B have a radius $R_A$ of 0.2500 mm. The entire comparative structure 150 is defined by a singe radius of 0.5000 mm. The thickness T of both structure 50 and comparative structure 150 is 0.1000 mm. By increasing the radius $R_A$ of arms 54A, 54B, the overall height H of structure 50 as compared to structure 150 remains unchanged as 0.2619 mm, but the overall length L of structure 50 compared to comparative structure 150 is decreased from 0.8036 mm to 0.6526 mm, and the position of leading edge 55 is raised by height h of 0.0595 mm.

Figure 6:
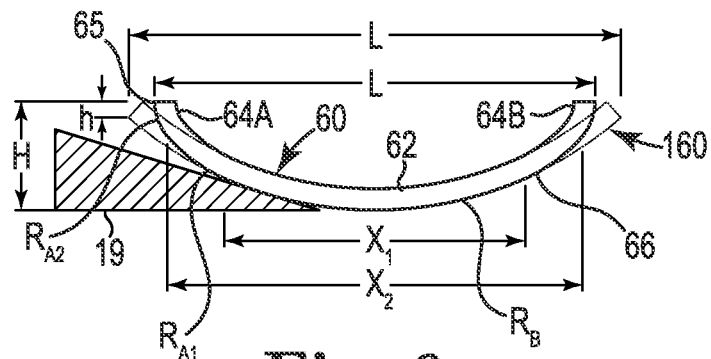
FIG. 6 is a schematic end view of another embodiment of a ramp-engaging section of an arm assembly according to this disclosure.

In FIG. 6, a ramp-engaging structure 60 has a trough portion 62, opposite arms 64A, 64B and a leading edge 65. The outer surface 66 of structure 60 is defined by three different radii. Trough portion 62 occupies approximately 70% of the length of structure 60. Also illustrated in FIG. 6, overlaid on structure 60, is comparative structure 160.

As one particular example, outer surface 66 of trough portion 62, which has a length $X_1$ of 0.2827 mm, is defined by a radius $R_B$ of 0.3500 mm. Arms 64A, 64B have a radius $R_{A1}$ of 0.1500 mm for a distance $X_2$ of 0.05265 mm, and then transition into a distal end portion that has a radius $R_{A2}$ of 0.0500. The entire comparative structure 160 is defined by a single radius of 0.3500 mm. The thickness T of both structure 60 and comparative structure 160 is 0.0200 mm. By twice increasing the radius of arms 64A, 64B, the overall height H of structure 60 as compared to structure 160 remains unchanged as 0.1018 mm, but the overall length L of structure 60 compared to comparative structure 160 is decreased from 0.4613 mm to 0.4131 mm, and the position of leading edge 65 is raised by height h of 0.0150 mm.

Figure 7:
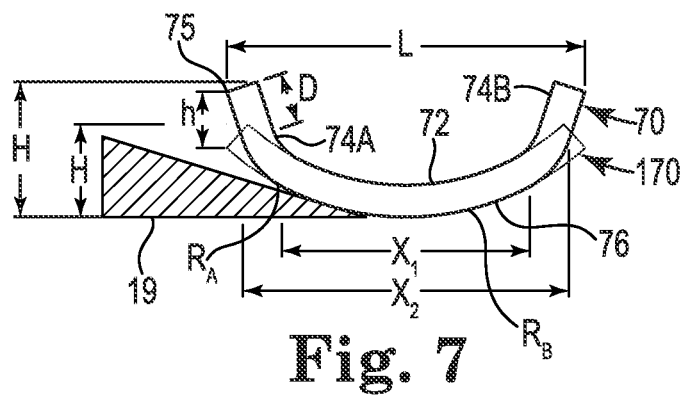
FIG. 7 is a schematic end view of yet another embodiment of a ramp-engaging section of an arm assembly according to this disclosure.

In FIG. 7, a ramp-engaging structure 70 has a trough portion 72, opposite arms 74A, 74B and a leading edge 75. The outer surface 76 of structure 70 is defined by at least two different radii, the radius changing at the transition between trough portion 72 and arms 74A, 74B. Trough portion 72 occupies approximately 70% of the length of structure 70. Also illustrated in FIG. 7, overlaid on structure 70, is comparative structure 170.

As one particular example, outer surface 76 of trough portion 72, which has a length $X_1$ of 0.2327 mm, is defined by a radius $R_B$ of 0.2500 mm. Arms 74A, 74B have a radius $R_A$ of 0.0750 mm for a distance of 0.0363 mm, and then transition into a straight (i.e., no curvature) distal end for a length D of 0.0485 mm. Thus, structure 70 has a central length $X_2$ of 0.3053 mm that is arcuate. In comparison, the entire comparative structure 170 is defined by a radius of 0.2500 mm. The thickness T of both structure 70 and comparative structure 170 is 0.0300 mm. With the increased radius of arms 74A, 74B and the straight distal end, the overall height H of structure 70 is 0.1270 mm, compared to the height of comparative structure 170 of 0.0871 mm. The position of leading edge 75 is raised by height h of 0.0527 mm. The overall width of structures 70, 170 is the same. The tighter radius $R_A$ produces a vertically stiff structure that could not be created in the same area (e.g., length) with a single radius, traditional structure.

Figure 8:
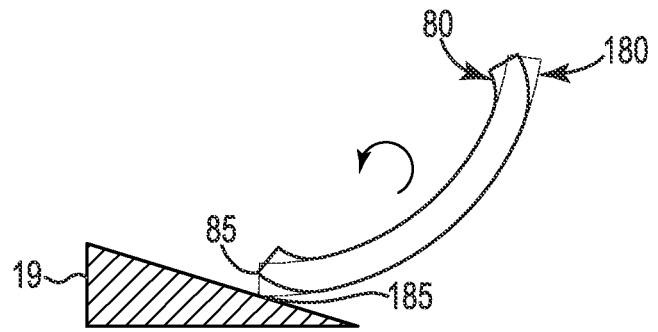
FIG. 8 is a schematic end of a ramp-engaging section of an arm assembly colliding with a ramp.

Three of the specific, non-limiting examples above (i.e., lift tab structures 40, 50 and 60 of FIGS. 4, 5 and 6, respectively) demonstrate that by decreasing (i.e., tightening) the radius at the edges of the lift tab, the height of the leading edge of the structure is increased without increasing the overall height of the lift tab structure and the tangent angle of the lift tab edge is increased. The increased edge height reduces the opportunity for the edge to collide with the ramp surface and thus create particles or other debris. FIG. 8 illustrates ramp-engaging structure 80, having arms formed by a tighter radius than its base trough, and a comparative structure 180 having a single radius of curvature. Leading edge 85 of structure 80 is higher than leading edge 185 of comparative structure 180, due to the two radii of curvature of structure 80. As illustrated in FIG. 8, as the arm assembly is moved into its parking position on a ramp 19, the lower leading edge 185 is more prone to collide with ramp 19 than leading edge 85. Additionally, each of the specific, non-limiting examples above (i.e., structures 40, 50, 60, 70) forms a greater angle between the lift tab structure and the ramp, providing more clearance between the lift tab and the ramp. In the event the lift tab structure should be rotated relative to the ramp edge such that the leading edges gets closer to the ramp, the proposed lift tab shape can tolerate a greater rotation before the leading edge begins to contact the ramp.

Thus, numerous embodiments of the ARM ASSEMBLY WITH LIFT TAB are disclosed. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. An arm assembly for a disc drive comprising:
load arm supporting a slider and comprising a lift tab;
the lift tab having a ramp-engaging region extending from a distal tip of the lift tab, the ramp-engaging region having an outer surface defined by a first radius and a second radius different than the first radius, each of the first radius and the second radius being a common distance from the distal tip of the lift tab.

2. The assembly of claim 1 wherein the outer surface is arcuate having a base trough and opposite arms, wherein at least a section of the trough is defined by a first radius and at least a section of the arms is defined by a second radius smaller than the first radius.

3. The assembly of claim 2 wherein the second radius is no more than 90% of the first radius.

4. The assembly of claim 2 wherein the second radius is no more than 75% of the first radius.

5. The assembly of claim 2 wherein the second radius is at least 0.05 mm less than the first radius.

6. The assembly of claim 2 wherein the second radius is at least 0.1 mm less than the first radius.

7. The assembly of claim 2 wherein the arms comprise a straight terminal end.

8. The assembly of claim 2 wherein a portion of the arms is defined by a third radius different than the first radius and different than the second radius.

9. The assembly of claim 2 wherein a portion of the arms is defined by a gradually varying radius.

10. An arm assembly for a disc drive comprising:
load arm supporting a slider and comprising a lift tab;
the lift tab having a length between a distal tip and the load beam, the lift tab having a ramp-engaging region having an outer surface with a continuous shape defining a base trough having a first radius and an arm having a second radius less than the first radius along a common cross-section taken orthogonal to the length of the lift tab.

11. The assembly of claim 10 wherein the lift tab extends distally from the load beam.

12. The assembly of claim 10 wherein the second radius is no more than 90% of the first radius.

13. The assembly of claim 10 wherein the second radius is no more than 75% of the first radius.

14. The assembly of claim 10 wherein the second radius is at least 0.05 mm less than the first radius.

15. The assembly of claim 10 wherein the second radius is at least 0.1 mm less than the first radius.

16. The assembly of claim 10 wherein the first radius is 0.075 mm-0.5 mm and the second radius is 0.05 mm-0.5 mm.

17. The assembly of claim 10 wherein the arm is defined by the second radius and a third radius different than the second radius.

18. The assembly of claim 10 wherein the arm is defined by the second radius and has a straight terminal end.

19. The assembly of claim 10 wherein a portion of the arm is defined by a gradually varying radius.

20. A disc drive comprising:
- a disc;
- an arm assembly supporting a slider and comprising a lift tab; and
- a parking ramp;
- the lift tab having a ramp-engaging region with an outer surface defined by a first radius and a second radius different than the first radius, with the first radius and the second radius in a common cross-section of the ramp-engaging region.

* * * * *